J. BROPHY.
ROAD MACHINE.
APPLICATION FILED APR. 21, 1913.

1,103,936.

Patented July 21, 1914.

Witnesses.
Charles Westrich
Samuel H. Shanley

Inventor:
Joseph Brophy
per
Attorney.

UNITED STATES PATENT OFFICE.

JOSEPH BROPHY, OF BERGLAND, MICHIGAN.

ROAD-MACHINE.

1,103,936.  Specification of Letters Patent.  Patented July 21, 1914.

Application filed April 21, 1913.  Serial No. 762,662.

*To all whom it may concern:*

Be it known that I, JOSEPH BROPHY, a citizen of the United States, residing at Bergland, in the county of Ontonagon and State of Michigan, have invented certain new and useful Improvements in Road-Machines, of which the following is a specification.

The invention which is the subject-matter of the present application for patent is a machine for rolling snow and earth on highways, streets, etc., and the object of the invention is to provide a novel and improved self-propelled machine of this kind having means for scraping the snow or dirt and packing the same. This object is attained by a combination and arrangement of parts to be hereinafter described and claimed, and in order that the invention may be better understood, reference is had to the accompanying drawing, in which—

Figure 1:
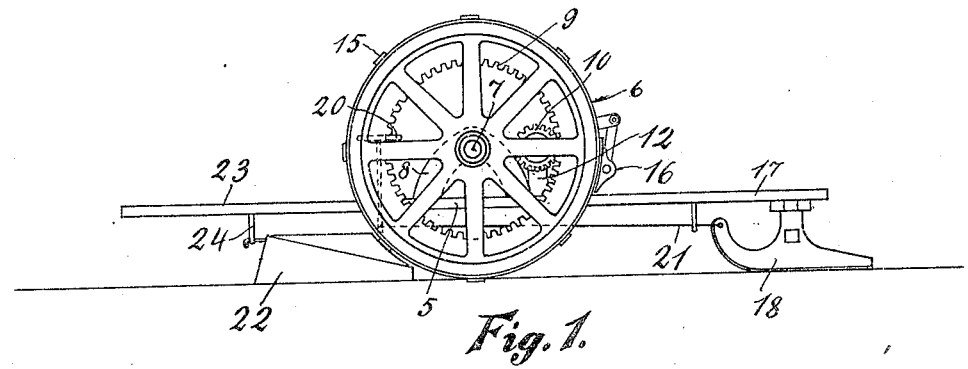
Figure 2:
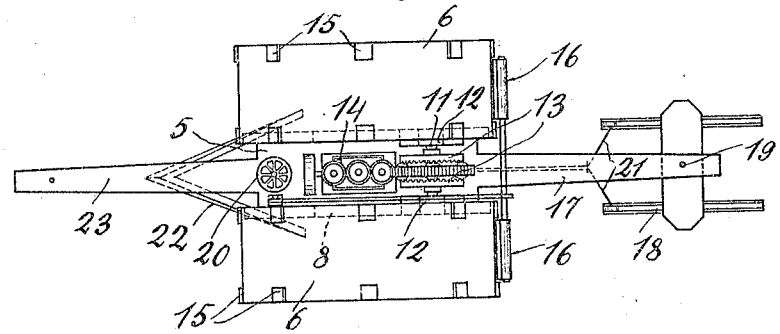
Figure 3:
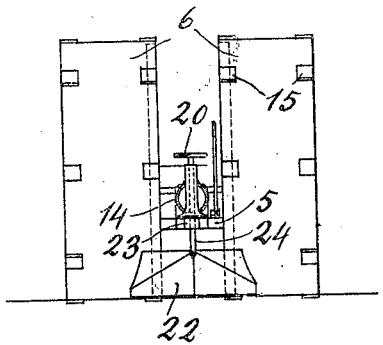
Figure 4:
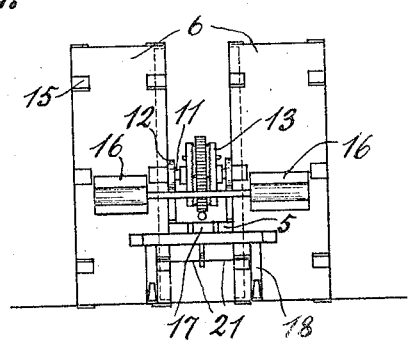

Figure 1 is an elevation of the machine; Fig. 2 is a plan view thereof; Fig. 3 is a front elevation; and Fig. 4 is a rear elevation.

Referring specifically to the drawing, 5 denotes a platform which is carried by a pair of traction wheels 6 having wide rims so as to serve as rollers for packing the snow or dirt. The wheels are independently mounted on stub axles 7 extending from stands 8 carried by the platform on the sides thereof. The wheels are fitted with internal gears 9 for driving the same, said gears being in mesh with pinions 10 carried by a drive shaft 11 supported in suitable bearings 12 carried by the platform. The drive shaft is preferably in two sections similar to the drive axle of an automobile, and a differential 13 for driving said sections is provided, the differential being suitably geared to the engine 14, which latter is mounted on the platform, and may be an ordinary internal-combustion engine. The rims of the wheels 6 have traction spurs or calks 15 near their edges, leaving the middle portion of the rims smooth and without projections, in order that a brake 16 may be used. A brake is provided for each wheel, and the same also operates as a scraper to remove snow and dirt which may stick to the rims. The wheels 6 will be built in different sizes and weights to suit the community in which the machine is to be used.

Suitable mechanism for controlling the drive gearing, guards for the same, a reversing gear and other accessories will be provided, but as they form no part of the invention, they have not been illustrated.

The platform 5 has a narrow, central, rearward extension 17 which is supported at its rear extremity on a sled 18, the latter being swiveled to the extension, as indicated at 19, so that it may also be employed for steering purposes. A steering wheel 20, mounted on the platform, is connected by cables 21 to the sled. For snow road work the sled 18 is used, but when the machine is employed on dirt roads, the sled will be taken off and a wheeled truck substituted therefor.

The sled 18 (or truck) supports the rear end of the machine and prevents the same from tilting in this direction. The support for the front end of the machine is a scraper or plow 22 having rearwardly diverging mold boards or scraper blades so as to throw the snow or dirt to both sides. The scraper is connected to the under side of a forward extension 23 of the platform 5 and its rear end comes close to the wheels 6. The scraper is inside the tracks made by the wheels and throws the snow or dirt in the path thereof so that it is packed by the wheels passing over the same. The scraper is loosely hitched to the extension 23 by means of a suitable connection 24 so that it may adjust itself to turns made by the machine. For certain kinds of work the positions of the sled 18 and the scraper 22 may be exchanged to bring the former in front and the latter to the rear of the machine.

The machine herein described is self-propelled, it can be easily controlled, and it is highly efficient in operation. The engine 14 and other parts mounted on the platform 5 give sufficient weight so that the snow or dirt will be tightly packed by the wheels 6.

I claim:

A road machine comprising a pair of laterally spaced packer wheels, a platform suspended between said wheels below the axles thereof, and having extensions in front and to the rear of the packer wheels, and ground-engaging supports carried by the front and rear platform extensions, one of said supports being dirigible and the other support being a scraper.

In testimony whereof I affix my signature in presence of two witnesses.

JOSEPH BROPHY.

Witnesses:
 CHAS. WESTRICH,
 SAMUEL H. SHARKEY.